(12) United States Patent  
Ichihara

(10) Patent No.: US 10,266,261 B2  
(45) Date of Patent: Apr. 23, 2019

(54) ELECTRICITY GENERATING APPARATUS AND UNMANNED AERIAL VEHICLE EQUIPPED WITH SAME

(71) Applicant: PRODRONE CO., LTD., Nagoya-shi, Aichi (JP)

(72) Inventor: Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/567,565

(22) PCT Filed: Aug. 8, 2016

(86) PCT No.: PCT/JP2016/073274  
§ 371 (c)(1),  
(2) Date: Oct. 18, 2017

(87) PCT Pub. No.: WO2017/030034  
PCT Pub. Date: Feb. 23, 2017

(65) Prior Publication Data  
US 2018/0134384 A1 May 17, 2018

(30) Foreign Application Priority Data  
Aug. 14, 2015 (JP) .................. 2015-160227

(51) Int. Cl.  
*G01C 23/00* (2006.01)  
*B64C 39/02* (2006.01)  
(Continued)

(52) U.S. Cl.  
CPC ............ *B64C 39/024* (2013.01); *B64C 27/08* (2013.01); *B64D 27/24* (2013.01); *B64D 37/02* (2013.01);  
(Continued)

(58) Field of Classification Search  
CPC . B64C 39/024; B64C 27/08; B64C 2201/027; B64C 2201/042; B64C 2201/108; B64D 27/24; B64D 37/02  
(Continued)

(56) References Cited

U.S. PATENT DOCUMENTS 4,694,803 A 9/1987 Asakura et al.  
5,177,677 A 1/1993 Nakata et al.  
(Continued)

FOREIGN PATENT DOCUMENTS

JP S61-241435 A 10/1986  
JP H02-237468 A 9/1990  
(Continued)

OTHER PUBLICATIONS

Sep. 27, 2016 International Search Report issued in International Patent Application No. PCT/JP2016/073274.

*Primary Examiner* — Shardul D Patel  
(74) *Attorney, Agent, or Firm* — Oliff PLC

(57) ABSTRACT

An electricity generating apparatus capable of efficiently and safely charging a storage battery in an unmanned aerial vehicle during its flight and an unmanned aerial vehicle equipped with such apparatus. The apparatus is mounted in the vehicle, including a fuel tank which is a container body to reserve fuel, an electric generator unit connected to the fuel tank, tilt measurement means capable of measuring a tilt of the fuel tank, and electricity generation control means for controlling operation of generating electricity by the electric generator unit, wherein the electric generator unit is capable of charging a storage battery in the vehicle during flight, and the electricity generation control means drives the electric generator unit when a tilt angle of the fuel tank indicated by the tilt measurement means is within a safe angle which is  
(Continued)

a predetermined threshold angle, as well as an unmanned aerial vehicle equipped with such apparatus.

8 Claims, 2 Drawing Sheets

(51) Int. Cl.
*B64C 27/08* (2006.01)
*B64D 27/24* (2006.01)
*B64D 37/02* (2006.01)
*B64D 27/02* (2006.01)

(52) U.S. Cl.
CPC .. *B64C 2201/027* (2013.01); *B64C 2201/042* (2013.01); *B64C 2201/108* (2013.01); *B64D 2027/026* (2013.01); *Y02T 50/62* (2013.01)

(58) Field of Classification Search
USPC ...... 701/3, 45; 244/152; 290/40 B; 220/141; 340/945
See application file for complete search history.

(56) References Cited

U.S. PATENT DOCUMENTS

| | | | | |
|---|---|---|---|---|
| 6,378,469 | B1* | 4/2002 | Hiranuma | F02B 63/04 123/195 C |
| 2003/0019529 | A1* | 1/2003 | Reinelt | B60K 15/04 137/592 |
| 2008/0051947 | A1* | 2/2008 | Kemp | B64D 45/0015 701/3 |
| 2008/0133277 | A1* | 6/2008 | Jang | A61B 5/0002 705/3 |
| 2013/0205941 | A1 | 8/2013 | Tanose | |
| 2013/0215009 | A1* | 8/2013 | Fukumoto | G09G 5/37 345/156 |
| 2013/0233964 | A1* | 9/2013 | Woodworth | B64C 37/02 244/2 |
| 2015/0014475 | A1 | 1/2015 | Taylor et al. | |
| 2015/0115108 | A1* | 4/2015 | Benson | B60L 11/1809 244/53 R |
| 2015/0153740 | A1* | 6/2015 | Ben-Shachar | G05D 1/0676 701/16 |
| 2016/0090184 | A1* | 3/2016 | Ghoshal | B60L 8/003 416/170 R |
| 2016/0200421 | A1* | 7/2016 | Morrison | B64C 13/18 244/17.23 |
| 2017/0305547 | A1* | 10/2017 | Tamkin, Sr. | B08B 1/001 |
| 2017/0313433 | A1* | 11/2017 | Ozaki | B64C 27/08 |

FOREIGN PATENT DOCUMENTS

| | | |
|---|---|---|
| JP | H11-206024 A | 7/1999 |
| JP | 2001-027128 A | 1/2001 |
| JP | 2002-154341 A | 5/2002 |
| JP | 2004-111212 A | 4/2004 |
| JP | 2008-198621 A | 8/2008 |
| JP | 2009-277453 A | 11/2009 |
| JP | 2015-085934 A | 5/2015 |
| JP | 2016-43927 A | 4/2016 |
| JP | 2016-88110 A | 5/2016 |
| JP | 2016-88111 A | 5/2016 |
| JP | 2016-222244 A | 12/2016 |
| WO | 2012/053276 A1 | 4/2012 |

* cited by examiner

ELECTRICITY GENERATING APPARATUS AND UNMANNED AERIAL VEHICLE EQUIPPED WITH SAME

TECHNICAL FIELD

The present invention relates to an electricity generating apparatus and an unmanned aerial vehicle equipped with same.

BACKGROUND ART

Conventionally, miniature unmanned aerial vehicles which are typified by unmanned helicopters for industrial use have been expensive and hard to obtain and manipulative skills have been needed to make them fly stably. However, a great advance has been made lately in improvement of a suite of sensors and software which are used for attitude control and autonomous flying of unmanned aerial vehicles and, consequently, maneuverability of unmanned aerial vehicles has improved significantly. Also, high-performance airframes of such vehicles have become available at a moderate price. Especially as for miniature multicopters, because their rotor structure is simple as compared with that of helicopters and they are easy to design and maintain, attempts are now made to apply multicopters to diverse missions in a wide range of fields, not only for hobby purposes.

CITATION LIST

Patent Literature

PTL1: JP 2002-154341 A
PTL2: JP 2001-27128 A
PTL3: JP H11-206024 A
PTL4: JP H2-237468 A
PTL5: JP S61-241435 A

SUMMARY OF INVENTION

Technical Problem

Multicopters which are unmanned aerial vehicles generally fly with a battery which is a storage battery as a power source. As means for extending continuous flight time and a flight distance of such a multicopter, for example, inter alia, it is conceivable to mount an electric generator which is capable of generating electric power using fuel in the airframe and charge the battery during flight of the multicopter.

In a case where an electric generator is mounted in a multicopter, it is required to make a configuration so that a battery can be charged efficiently and safely in its special usage environment. More specifically, it is required to consider a structure for supplying fuel and a contrivance for preventing the damage of an accident caused by fuel from spreading, taking account of, for example, nature as an aircraft that flies in the air and nature specific to a multicopter that flies horizontally by tilting its airframe. Also, in consideration of increase in the number of flights of unmanned aerial vehicles for industrial use and flight area expansion as well, countermeasures should be taken in advance against a noise problem which may be posed by sound produced by operation of an electric generator.

In consideration of the problem noted above, a problem to be solved by the present invention resides in providing an electricity generating apparatus capable of efficiently and safely charging a storage battery comprised in an unmanned aerial vehicle during its flight and an unmanned aerial vehicle equipped with such an apparatus.

Solution to Problem

To solve the foregoing problem, an electricity generating apparatus of the present invention which is mounted in an unmanned aerial vehicle includes a fuel tank which is a container body to reserve fuel, an electric generator unit to which the fuel tank is connected, tilt measurement means capable of measuring a tilt of the fuel tank, and electricity generation control means for controlling operation of generating electricity by the electric generator unit, wherein the electric generator unit is capable of charging a storage battery comprised in the unmanned aerial vehicle during flight of the unmanned aerial vehicle, and the electricity generation control means drives the electric generator unit when a tilt angle of the fuel tank indicated by the tilt measurement means is within a safe angle which is a predetermined threshold angle.

The unmanned aerial vehicle is equipped with the electric generator unit that is capable of charging the storage battery which is the power source of the vehicle during its flight, and it is therefore possible to realize continuous flight time and a flight distance in excess of the electricity storing capacity of the storage battery. In addition, by deactivating the electricity generating operation of the electric generator unit when the fuel tank has tilted beyond the safe angle, for example, inter alia, supplying fuel containing air more than required to the electric generator unit can be prevented. Thereby, an abnormal operation of the electric generator unit is avoided and the storage battery can be charged safely.

In addition, it is preferable that the electricity gene rating apparatus of the present invention further includes remaining fuel measurement means capable of measuring the remaining amount of fuel reserved in the fuel tank, and the electricity generation control means adjusts the safe angle, based on the remaining amount of fuel indicated by the remaining fuel measurement means.

The safe angle of the fuel tank, in other words, a threshold angle within which the tilt of the fuel tank is acceptable, also varies depending on the remaining amount of fuel reserved in the fuel tank. Hence, by enabling it to adjust the safe angle depending on the remaining amount of fuel, the storage battery can be charged efficiently. Now, as a way of adjusting the safe angle, it is conceivable to set a large safe angle when the remaining amount of fuel is large and set a small safe angle when the remaining amount of fuel is small.

In addition, it is preferable that the electricity gene rating apparatus of the present invention further includes atmospheric pressure measurement means for measuring atmospheric pressure, and the electricity generation control means adjusts an air/fuel ratio in the electric generator unit, based on a value of atmospheric pressure indicated by the atmospheric pressure detection means.

Because of its nature of flying in the air, an unmanned aerial vehicle is susceptible to a change in atmospheric pressure in comparison with means for moving on land. Hence, by providing the vehicle with means for measuring atmospheric pressure and adjusting an air/fuel ratio in the electric generator unit according to value measured by that means, the storage battery can be charged more stably.

In addition, it is preferable that the electricity gene rating apparatus of the present invention further includes remaining electric power measurement means for measuring remaining battery power of the storage battery, and the electricity generation control means initiates charging of the storage battery when the remaining battery power indicated by the remaining electric power measurement means has become equal to or less than a predetermined threshold value.

By initiating the charging operation when the remaining battery power has become equal to or less than a predetermined threshold value, it is possible to prevent an unnecessary electricity generating operation of the electric generator unit and implement a more need-responsive charging operation.

In addition, it is preferable that the electricity gene rating apparatus of the present invention further includes fall detection means for detecting a fall of the unmanned aerial vehicle, and the electricity generation control means deactivates driving of the electric generator unit when the fall detection means has detected a fall of the unmanned aerial vehicle.

By deactivating the electric generator unit in case of a fall of the unmanned aerial vehicle, it is possible to prevent the damage of an accident after the fall from spreading.

In addition, it is preferable that the electricity gene rating apparatus of the present invention further includes storing means in which a noise restriction area which is a predetermined area in geography or within a plant is registered and current position locating means for locating a flying position of the unmanned aerial vehicle in geography or within the plant, and the electricity generation control means deactivates driving of the electric generator unit when the flying position falls within the noise restriction area.

By preregistering an area where precautions against noise should be taken and deactivating the electric generator unit within the area, it is possible to prevent a noise problem which may be posed by sound produced by operation of the electric generator unit, for example, even in a case where the number of flights of unmanned aerial vehicles for industrial use has increased and flight areas have expanded.

Also, to solve the foregoing problem, an unmanned aerial vehicle of the present invention is characterized by being equipped with an electricity generating apparatus of the present invention. In addition, it is preferable that the unmanned aerial vehicle of the present invention is a rotorcraft equipped with a plurality of rotors.

A rotorcraft such as, e.g., a multicopter which is an unmanned aerial vehicle has specific nature of flying horizontally with the airframe tilting. The electricity generating apparatus of the present invention has a feature that driving of the electric generator unit is performed when the tilt angle of the fuel tank is within the safe angle and can be used favorably, particularly for such a rotorcraft.

In addition, it is preferable that the unmanned aerial vehicle of the present invention further includes an attitude stabilization device, and the attitude stabilization device holds the fuel tank.

With the fuel tank held by the attitude stabilization device, the tilt of the fuel tank during flight of the unmanned aerial vehicle can be decreased, and it can be ensured that the storage battery can be charged for a longer time.

In addition, it is preferable that the electric generator unit is also capable of supplying electric power to electronic and electric equipment of the unmanned aerial vehicle other than the storage battery, the electric generator unit charges a surplus of electric power generated by it over the electric power supplied to the electronic and electric equipment into the storage battery of the unmanned aerial vehicle, and when electric power consumed by the electronic and electric equipment has exceeded the amount of electricity generated by the electric generator unit, shortage of electric power is supplemented by the storage battery of the unmanned aerial vehicle.

The electric generator unit is capable of supplying electric power generated by it to not only the storage battery of the unmanned aerial vehicle but also the electronic and electric equipment comprised in the unmanned aerial vehicle; thus, it is possible to suppress discharge from the storage battery during charging and charge the storage battery efficiently. In this regard, the electric generator unit is required to be able to supply electric power more than electric power to be consumed by the unmanned aerial vehicle when flying normally and hovering in the air. This is because the electric generator unit in the present configuration charges a surplus of electric power generated into the storage battery. Moreover, electric power consumed by the unmanned aerial vehicle is not constant at all times and may rise abruptly in response to ascending or high-speed movement of the unmanned aerial vehicle or impacted by wind among others. Taking such nature of the unmanned aerial vehicle into consideration, a configuration is made such that, if electric power consumed by the unmanned aerial vehicle exceeds the amount of electricity generated by the electric generator unit, shortage of electric power is supplemented by the storage battery; thus, it is possible to make the unmanned aerial vehicle fly stably. Furthermore, in the present configuration, the state of the storage battery is surely switched to either charge mode or discharge mode in response to changing situations. Therefore, it is not needed to provide complicated circuitry to enable concurrent charging and discharging of the storage battery, and even a storage battery that is hard to charge and discharge concurrently can be used.

Advantageous Effects of Invention

As described above, according to an electricity generating apparatus and an unmanned aerial vehicle equipped with the same which pertain to the present invention, it is possible to efficiently and safely charge a storage battery comprised in an unmanned aerial vehicle during its flight.

DESCRIPTION OF EMBODIMENTS

In the following, descriptions are provided about an electricity generating apparatus and an unmanned aerial vehicle equipped with the same which pertain to the present invention with the aid of the drawings.

[General Description of Airframe Configuration]

Figure 1:
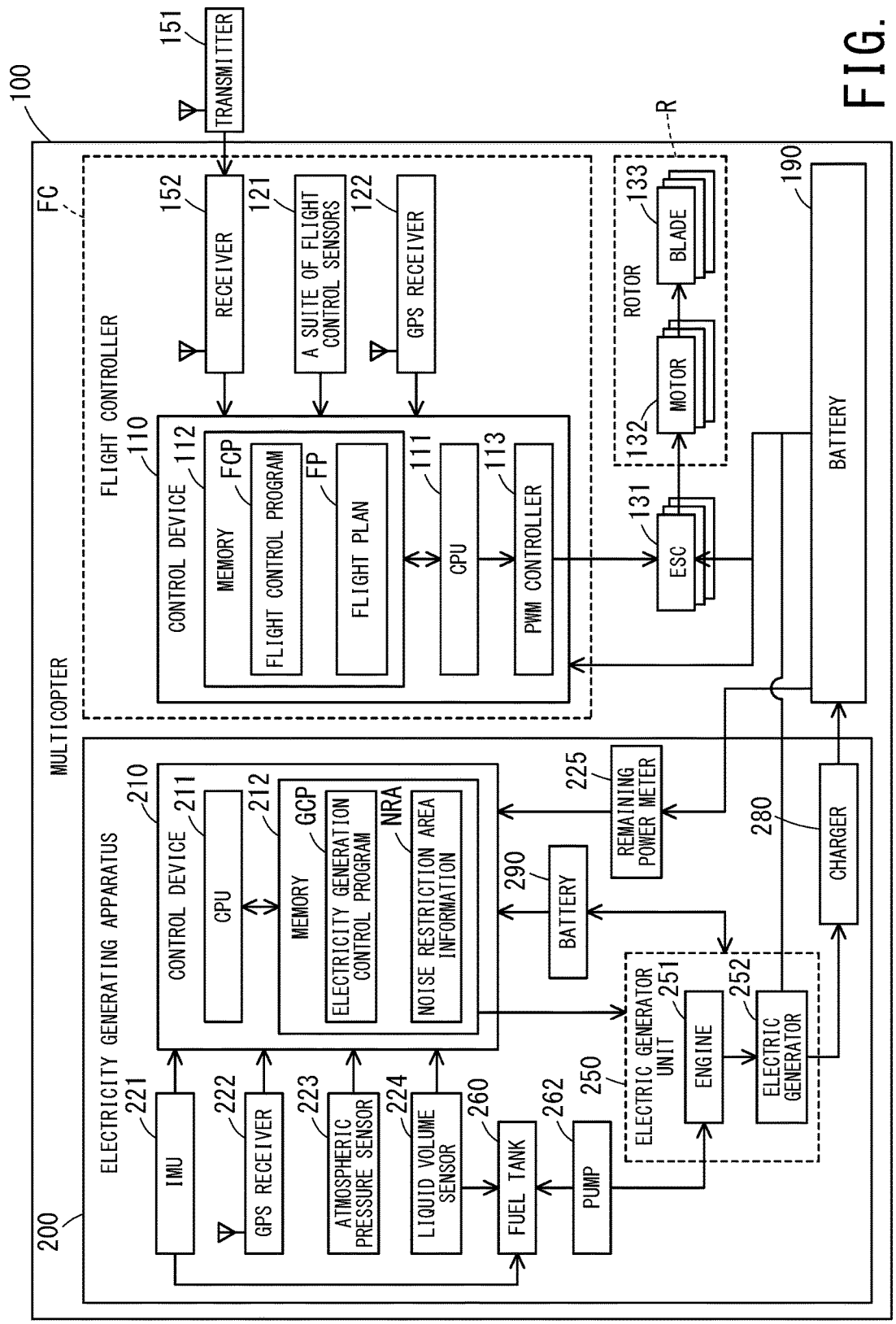
FIG. 1 is a block diagram depicting a functional configuration of a multicopter pertaining to an embodiment.

FIG. 1 is a block diagram depicting a functional configuration of a multicopter 100 which is an unmanned aerial vehicle pertaining to an embodiment of the present invention. The multicopter 100 is comprised of a flight controller FC, a plurality of rotors R, an ESC 131 (Electric Speed Controller) provided for each rotor R, a battery 190 which supplies electric power to these components, and an electricity generating apparatus 200.

Each rotor R is comprised of a motor 132 and a blade 133 coupled to its motor output shaft. The ESC 131 is connected with the motor 132 of each rotor R and rotates the motor 132 at a speed commanded from the flight controller. The number of rotors of the multicopter 100 is not limited specifically and can be changed appropriately in a range from a helicopter with two rotors R to an octocopter with eight rotors R, and up to a multicopter equipped with more than eight rotors, depending on required flight stability and allowable cost among others.

The flight controller FC includes a control device 110 which is a microcontroller. The control device 110 includes a CPU 111 which is a central processing unit, a memory 112 which is a storage device such as ROM and RAM, and a PWM (Pulse Width Modulation) controller 113 which controls the rotating speed of each motor 132 via the ESC 131.

The flight controller FC further includes a suite of flight control sensors 121 and a GPS receiver 122 (these are hereinafter also referred to as "sensors and other equipment") which are connected to the control device 110. In the suite of fight control sensors 121 of the multicopter 100 in the present embodiment, a triaxial acceleration sensor, a triaxial angular velocity sensor, an atmospheric pressure sensor (an altitude sensor), a geomagnetic sensor (a direction sensor), etc. are included. Through these sensors and other equipment, the control device 110 is adapted to be able to acquire the aircraft's positional information including latitude/longitude, altitude, and a heading azimuth during flight, in addition to a tilt and turn of the airframe.

In the memory 112 of the control device 110, there is stored a flight control program FCP, i.e., a program in which an algorithm is programmed to control attitude and basic flying operations when the multicopter 100 files. According to a command from an operator (a transmitter 151), the flight control program FCP causes the multicopter 100 to fly, while adjusting the rotating speed of the respective rotors R and compensating the airframe attitude and positional misalignment, based on information acquired from the sensors and other equipment.

Piloting the multicopter 100 is performed by the operator through the transmitter 151. Additionally, with parameters such as, e.g., a flight route, speed, and altitude which should be preregistered as a flight plan FP, it is also possible to cause the multicopter to fly autonomously toward a destination (such an autonomous flight will hereinafter be referred to as "autopilot").

The multicopter 100 in the present embodiment is thus provided with enhanced flight control functionality. However, an unmanned aerial vehicle in the present invention is not limited to the configuration of the multicopter 100; for example, an airframe in which some of the sensors and other equipment are dispensed with and an airframe which is able to fly only by manual piloting without being provided with an autopilot function can also be used, provided that the airframe is equipped with the electricity generating apparatus 200. Moreover, an unmanned aerial vehicle in the present invention is not limited to a rotorcraft and may be a fixed-wing craft equipped with the electricity generating apparatus 200.

[General Description of the Electricity Generating Apparatus]

The electricity generating apparatus 200 is a device capable of charging the battery 190 of the multicopter 100 during flight of the multicopter 100. The electricity generating apparatus 200 includes an electric generator unit 250 which generates electric power to be charged into the battery 190 and a fuel tank 260 which is a container body in which fuel to be used by the electric generator unit 250 is reserved. The electric generator unit 250 in the present embodiment is comprised of a commonly used engine 252 for generating electricity and an electric generator 252. The battery 190 of the multicopter 100 is connected to a charger 280 comprised in the electricity generating apparatus 200, and the electric generator unit 250 charges electric power generated by it into the battery 190 via the charger 280. Now, the electric generator unit 250 is started up by a battery 290 comprised in the electricity generating apparatus 200. After startup of the electric generator unit 250, fuel in the fuel tank 260 is supplied to the electric generator unit 250 by a pump 262.

When the electric generator unit 250 is started up and charging the battery 190 is initiated, the electric generator unit 250 also supplies the rotors R of the multicopter 100 and electronic and electric equipment such as the control device 110 with electric power generated by it. The electric generator unit 250 allocates a surplus of electric power over the electric power supplied to the electronic and electric equipment of the multicopter 100 for charging the battery 190. This enables it to suppress discharge from the battery 190 during charging and charge the battery 190 efficiently. Now, electric power consumed by, e.g., inter alia, the rotors R is not constant at all times and may rise abruptly in response to ascending or high-speed movement of the multicopter 100 or impacted by wind among others. In the present embodiment, if electric power consumed by the multicopter 100 exceeds the amount of electricity generated by the electric generator unit 250, shortage of electric power is supplemented by the battery 190. This enables it to make the multicopter 100 fly stably even during charging of the battery 190. Moreover, in the present embodiment, the state of the battery 190 is appropriately switched to either charge mode or discharge mode in response to changing situations. Therefore, it is not needed to provide complicated circuitry to enable concurrent charging and discharging of the battery 190, and it is possible to use even the battery 190 that is hard to charge and discharge concurrently.

The electricity generating apparatus 200 further includes a control device 210 which is a microcontroller. The control device 210 includes a CPU 211 which is a central processing unit and a memory 212 which is storing means such as ROM and RAM. In the memory 212 of the control device 210, an electricity generation control program GCP is registered which is electricity generation control means for controlling operation of generating electricity by the electric generator unit 250.

The multicopter 100 of the present embodiment is thus equipped with the electricity generating apparatus 200 that is capable of charging the battery 190 which is the power source during its flight, and it is therefore possible to realize continuous flight time and flight distance in excess of the electricity storing capacity of the battery 190.

[Tilt Watch Function]

An IMU (Inertial Measurement Unit) 221 capable of measuring a tilt angle of the fuel tank 260 is connected to the control device 210 of the electricity generating apparatus 200. The IMU 221 is a commonly used inertial measurement device and is comprised of a triaxial acceleration sensor and a triaxial angular velocity sensor.

Figure 2A:
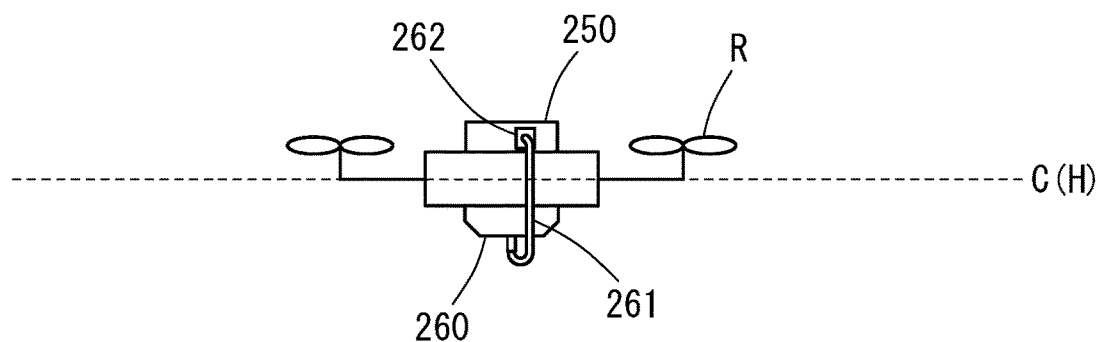
FIG. 2 is a schematic diagram depicting an external appearance of the multicopter pertaining to the embodiment.
Figure 2B:
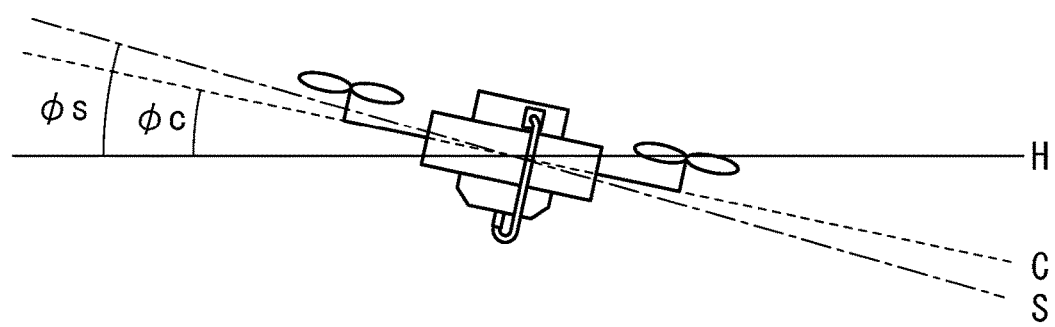

FIG. 2 is a schematic diagram depicting an external appearance of the multicopter 100. FIG. 2(a) is a schematic diagram depicting a state in which the multicopter 100 hovers and FIG. 2 (b) is a schematic diagram depicting a state in which the multicopter 100 flies horizontally with the airframe tilting. Referring to FIG. 2, descriptions are provided below about a tilt watch function of the electricity generating apparatus 200.

As depicted in FIG. 2, in the present embodiment, the electric generator unit 250 is fixed to a top portion of the multicopter 100 and the fuel tank 260 is fixed to an underside portion of the multicopter 100. Fuel in the fuel tank 260 is sucked up by the pump 262 and is supplied to the electric generator unit 250 through a tube 261 from the bottom of the tube fuel tank 260. In addition, the control device 210 is accommodated in the housing of the multicopter 100. Now, disposition of respective components of the electricity generating apparatus 200 is not limited to the configuration of the multicopter 100 and can be changed appropriately.

A solid line H in FIG. 2 denotes a horizontal plane H in the air. A broken line C in FIG. 2 denotes a tilt angle φc of the fuel tank 160, or the multicopter 100 to which the fuel tank 260 is fixed with respect to the horizontal plane H. A dashed dotted line S in FIG. 2 likewise denotes a safe angle φs that is a threshold angle within which the tilt of the fuel tank is acceptable.

The electricity generation control program GCP monitors an output value of the IMU 221 and drives the electric generator unit 250 when the tilt angle of the fuel tank 260 indicated by the IMU 221 is within the safe angle φs. Then, when the fuel tank has tilted beyond the safe angle φs, the program deactivates the electricity generating operation of the electric generator unit 250. Thereby, for example, inter alia, supplying fuel containing air more than required to the electric generator unit 250 can be prevented, an abnormal operation of the electric generator unit 250 is avoided, and the battery 190 can be charged safely.

In addition, the multicopter 100 has a specific nature of flying horizontally with the airframe tilting. The electricity generating apparatus 200 in the present embodiment drives the electric generator unit 250 when the tilt angle of the fuel tank 260 is within the safe angle φs, and this is therefore favorable especially when making a rotorcraft like the multicopter 100 fly safely. Now, the safe angle φs should be set as appropriate for a particular embodiment, because the safe angle φs differs depending on, inter alia, the shape of the fuel tank 260, a positional relation between the fuel tank 260 and the electric generator unit 250, and a structure for supplying fuel to the electric generator unit 250.

Additionally, an attitude stabilization device such as a camera stabilizer, which is publicly known, for use in an unmanned aerial vehicle, may be mounted in the multicopter 100 to hold the fuel tank 2 by the attitude stabilization device, so that the tilt angle φc of the fuel tank 260 during flight of the multicopter 100 can be decreased and it can be ensured that the battery 190 can be charged for a longer time.

[Safe Angle Adjustment Function]

Also, a liquid volume sensor 224 which is remaining fuel measurement means capable of measuring the remaining amount of fuel reserved in the fuel tank 260 is connected to the control device 210 of the electricity generating apparatus 200. Then, the electricity generation control program GCP in the present invention dynamically adjusts the safe angle φs, based on the remaining amount of fuel indicated by the liquid volume sensor 224. More specifically, the electricity generation control program GCP sets a large safe angle φs when the remaining amount of fuel in the fuel tank 260 is large and sets a small safe angle φs when the remaining amount of fuel is small. Now, for the liquid volume sensor 224, for example, a publicly-known liquid level sensor can be used.

The safe angle φs of the fuel tank 260, in other words, a threshold angle within which the tilt of the fuel tank 260 is acceptable, also varies depending on the remaining amount of fuel reserved in the fuel tank 260. The electricity generating apparatus 200 in the present embodiment is provided with the liquid volume sensor 224 and the safe angle φs can be adjusted depending on the remaining amount of fuel in the fuel tank 260, so that unnecessary deactivation of the electric generator unit 250 is prevented and the battery 190 can be charged efficiently.

[Air-Fuel Ratio Adjustment Function]

Also, an atmospheric pressure sensor 223 which is atmospheric pressure measurement means for measuring atmospheric pressure is connected to the control device 210 of the electricity generating apparatus 200. Then, the electricity generation control program GCP in the present embodiment dynamically adjusts the air/fuel ratio in the electric generator unit 250, based on a value of atmospheric pressure indicated by the atmospheric pressure sensor 223. More specifically, the electricity generation control program GCP adjusts the air/fuel ratio to be rich or lean depending on a rise or decline in the value of atmospheric pressure to prevent a decline in heat efficiency and imperfect fuel of the electric generator unit 250.

Because of its nature of flying in the air, an unmanned aerial vehicle is susceptible to a change in atmospheric pressure in comparison with means for moving on land. The electricity generating apparatus 200 in the present embodiment is provided with the atmospheric pressure sensor 223 and adjusts the air/fuel ratio in the electric generator unit 250 depending on a measured value of atmospheric pressure, so that the battery 190 can be charged more stably.

[Remaining Battery Power Monitoring Function]

Also, a remaining power meter 225 which is remaining electric power measurement means for measuring remaining battery power of the battery 190 is connected to the control device 210 of the electricity generating apparatus 200. The remaining power meter 225 is a commonly used remaining power meter which measures remaining battery power of the battery 190 from a voltage value. Then, the electricity generation control program GCP in the present embodiment initiates charging of the battery 190 when the remaining battery power indicated by the remaining power meter 225 has become equal to or less than a predetermined threshold value. When the remaining battery power of the battery 190 has become equal to or less than a predetermined threshold value, the operation of charging the battery 190 is initiated; thus, an unnecessary electricity generating operation of the electric generator unit 250 is prevented and more need-responsive charging of the battery 190 is enabled. Now, a threshold value of the remaining battery power of the battery 190 may expediently be set, based on a particular mode of usage of the multicopter 100.

[Fall Detection Function]

In addition, the IMU 221 in the present embodiment also serves as fall detection means for detecting a fall of the multicopter 100. When the IMU 221 has detected a fall of the multicopter 100, the electricity generation control program GCP in the present embodiment automatically deactivates driving of the electric generator unit 250. This makes it possible to prevent the damage of an accident after the fall of the multicopter 100 from spreading. Now, as a method for detecting a fall of the multicopter 100, it is conceivable, inter alia, that a fall is determined to have occurred, for instance, if the acceleration sensor of the IMU 221 indicates 0 G for a period equal to or longer than a predetermined time.

[Noise Restriction Function]

Also, a GPS receiver 222 which is current position locating means for locating a geographical position of the flying multicopter 100 is connected to the control device 210 of the electricity generating apparatus 200. Also, noise restriction area information NRA which is latitude/longitude information of an area where precautions against noise should be taken is registered in the memory 212 of the control device 210. When the flying position of the multicopter 100 falls within a noise restriction area, the electricity generation control program GCP in the present embodiment deactivates driving of the electric generator unit 250. Thereby, it is possible to prevent a noise problem which may be posed by sound produced by operation of the electric generator unit 250, for example, even in a case where the number of flights of the multicopter 100 for industrial use has increased and flight areas have expanded.

Now, the scope of application of the noise restriction function is not limited to outdoor space. For a large-scale plant, for example, information representing a map inside its building and noise restriction area information may be registered into the memory 212 of the multicopter 100, and beacons compliant with a proximity profile of Bluetooth (registered trademark) Low Energy may be installed at given intervals. Then, the multicopter 100 may measure relative distances to these beacons and locate its current position when it is flying inside the building and may deactivate driving of the electric generator unit 250 in a noise restriction area; such a configuration is also conceivable.

While an embodiment of the present invention has been described hereinbefore, the present invention is not limited to the foregoing embodiment and can be modified in various ways without departing from the gist of the present invention. For example, although, in the foregoing embodiment, the electricity generating apparatus 200 includes, as its belongings, the IMU 221, GPS receiver 222, atmospheric pressure sensor 224, etc., the sensors and other equipment comprised in the multicopter 100 may be used as substitutes for such belongings.

The invention claimed is:

1. An electricity generating apparatus which is mounted in an unmanned aerial vehicle, comprising: a fuel tank which is a container body to reserve fuel; an electric generator to which the fuel tank is connected; electricity generation control controller for controlling operation of generating electricity by the electric generator; and an inertial measurement unit for detecting a fall of the unmanned aerial vehicle, wherein the electricity generation controller deactivates driving of the electric generator when the inertial measurement unit fall has detected a fall of the unmanned aerial vehicle.

2. An unmanned aerial vehicle equipped with the electricity generating apparatus as described in claim 1.

3. The unmanned aerial vehicle according to claim 2, wherein the unmanned aerial vehicle is a rotorcraft equipped with a plurality of rotors.

4. The electricity generating apparatus according to claim 1, wherein the inertial measurement unit comprises an inertial sensor.

5. The electricity generating apparatus according to claim 1, wherein the inertial measurement unit includes a triaxial acceleration sensor and a triaxial angular velocity sensor.

6. An electricity generating apparatus which is mounted in an unmanned aerial vehicle, comprising: a fuel tank which is a container body to reserve fuel; an electric generator to which the fuel tank is connected; electricity generation control controller for controlling operation of generating electricity by the electric generator; a memory in which a noise restriction area which is a predetermined area in geography or within a plant is registered; and a global positioning system (GPS) receiver for locating a flying position of the unmanned aerial vehicle in geography or within the plant, wherein the electricity generation controller deactivates driving of the electric generator when the flying position falls within the noise restriction area.

7. An unmanned aerial vehicle equipped with the electricity generating apparatus as described in claim 6.

8. The unmanned aerial vehicle according to claim 7, wherein the unmanned aerial vehicle is a rotorcraft equipped with a plurality of rotors.

* * * * *